United States Patent [19]
Kleider et al.

[11] Patent Number: 6,163,766
[45] Date of Patent: Dec. 19, 2000

[54] ADAPTIVE RATE SYSTEM AND METHOD FOR WIRELESS COMMUNICATIONS

[75] Inventors: John Kleider, Scottsdale; William Michael Campbell, Phoenix; Cynthia Ann Jaskie, Scottsdale, all of Ariz.

[73] Assignee: Motorola, Inc., Schaumburg, Ill.

[21] Appl. No.: 09/134,320

[22] Filed: Aug. 14, 1998

[51] Int. Cl.$^7$ ................................................. G10L 21/00
[52] U.S. Cl. ........................................... 704/229; 704/233
[58] Field of Search .................................... 704/200, 201, 704/229, 233, 219, 226, 227, 228

[56] References Cited

U.S. PATENT DOCUMENTS

| | | | |
|---|---|---|---|
| 5,012,518 | 4/1991 | Liu et al. ................................. | 704/222 |
| 5,305,421 | 4/1994 | Li ............................................ | 704/219 |
| 5,383,184 | 1/1995 | Champion ................................ | 370/62 |
| 5,414,796 | 5/1995 | Jacobs et al. ............................ | 704/221 |
| 5,657,420 | 8/1997 | Jacobs et al. ............................ | 704/223 |
| 5,778,338 | 7/1998 | Jacobs et al. ............................ | 704/223 |
| 5,940,439 | 8/1999 | Kleider etal. ............................ | 375/225 |

FOREIGN PATENT DOCUMENTS

| | | | |
|---|---|---|---|
| 0794631 | 10/1997 | European Pat. Off. ........... | H04L 1/00 |
| 9733402 | 12/1997 | WIPO ............................... | H04L 1/20 |

OTHER PUBLICATIONS

An article entitled "A Robust Variable–Rate Speech Coder" by A. Shen, B. Tang, A. Alwan and G. Pottie, Department of Electrical Engineering, UCLA, from 1995 IEEE.

An article entitled "Multiresolution Broadcast For Digital HDTV Using Joint Source/Channel Coding" by K. Ramchandran, A. Ortega, K. Metin Uz, and Martin Vetterli, Sr. Member IEEE, from 1993 IEEE.

An article entitled "Multiresolution Joint Source–Channel Coding Using Embedded Constellations For Power–Constrained Time–Varying Channels." by Igor Kozintsev and Kannon Ramchandran from 1996 IEEE.

An article entitled "Variable Rate Speech And Channel Coding For Mobile Communication" by E. Yuen, P. Ho, and V. Cuperman, School of Engineering Science, Simon Fraser University from 1994 IEEE.

An article entitled "Combined Source And Channel Coding For Variable–Bit–Rate Speech Transmission" by D.J. Goodman and C.E. Sundberg from The Bell System Technical Journal, Sep. 1983.

"An Adaptive–Rate Digital Communication System For Speech", Kleider et al., IEEE 1997, 0–8186–7919–0/97, pp. 1695–1698.

*Primary Examiner*—Richemond Dorvil
*Attorney, Agent, or Firm*—Gregory J. Gorrie

[57] ABSTRACT

A system and method for determining operating parameters to control a communication rate for an adaptive rate communication system includes a transmitter (101) to transmit a signal (135) through a channel (142) to a receiver (103). The receiver (103) determines operating parameters based on, among other things, an effective bit rate and a percentage of speech in the signal. The receiver conveys the operating parameters to the transmitter for use in subsequent communications from the transmitter (101) to the receiver (103).

18 Claims, 5 Drawing Sheets

ADAPTIVE RATE SYSTEM AND METHOD FOR WIRELESS COMMUNICATIONS

CROSS REFERENCE TO RELATED APPLICATIONS

This application is related to co-pending U.S. patent application Ser. No. 09/134,782 filed concurrently herewith, entitled "ADAPTIVE RATE SYSTEM AND METHOD FOR NETWORK COMMUNICATIONS", U.S. patent application Ser. No. 09/050,504 filed Mar. 30, 1998, entitled "ADAPTIVE-RATE CODED DIGITAL IMAGE TRANSMISSION", and U.S. patent application Ser. No. 08/806,783 filed Feb. 26, 1997, entitled "METHOD AND APPARATUS FOR ADAPTIVE RATE COMMUNICATION SYSTEM", which are assigned to the same assignee as the present application.

FIELD OF THE INVENTION

This invention relates in general to communication systems, and more specifically, to adaptive rate communication systems.

BACKGROUND OF THE INVENTION

Modern wireless communications systems for speech communications are commonly implemented using a speech coder operating at a fixed bit rate, a channel coder operating at a fixed bit rate, and a modulator operating at a fixed modulation format. These systems ordinarily rely on specific, modestly changing channel conditions, however, in a typical system, channel conditions are continuously changing and may experience dramatic variation. A problem with such systems is a failure to allocate optimal bit rates and modulation strategies for controlling the system elements based on current channel conditions.

For example, when an analog channel for speech communications has very little noise, existing systems do not take advantage of channel conditions. Alternatively, when the same channel degrades because of the presence of noise, existing systems do not compensate for such degrading channel conditions.

Typical network communication systems also experience changing channel conditions. For example, Internet packets (e.g., a set of bits of a predetermined size) may be transmitted via Internet Protocol. Systems using Internet Protocol typically deliver a packet without error and fail to deliver a packet with errors. Packets may also be delivered "late". Additionally, an intelligent router conveys packets via different communications paths based on system congestion. Speech communications systems using a network are designed to operate under modestly changing channel conditions. However, since channel conditions may change dramatically, a problem with such systems is an inability to adjust operating parameters when packets are delayed, lost, or out of sequence.

Additionally, current systems fail to change operating parameters when the available channel capacity fails to support the modulation rate. So, another problem with existing systems is a failure to reduce the bit-error-rate for the system.

Another problem with existing systems is that speech quality degrades because of lower bit rate speech coding. Current systems fail to provide a graceful degradation to lower bit rate speech coding when noise in the channel causes synthesized speech to be perceived as noisy, distorted, and unintelligible speech, instead of synthesized speech having less natural speech quality.

Another problem with existing wireless systems is adjusting power levels for a transmitter to compensate for noise in a channel. For example, when excessive noise is determined in a receiver, the receiver requests that the transmitter raise its power to overcome the noise in the channel. This is a problem because raising the power for the transmitter may not improve the quality of the speech synthesized at the receiver.

Thus, what is needed are a system and method to dynamically control operating parameters for a transmitter and a receiver based on changing channel conditions. What is also needed are a system and method for dynamically allocating bits for error coding based on noise level in a communication channel. What is also needed are a system and method that takes advantage of good channel conditions, and compensates for poor channel conditions to maintain voice quality.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures and:

The exemplification set out herein illustrates a preferred embodiment of the invention in one form thereof, and such exemplification is not intended to be construed as limiting in any manner.

DETAILED DESCRIPTION OF THE PREFERRED EMBODIMENTS

The present invention provides, among other things, a system and method for controlling a communication rate for an adaptive rate communication system. In the preferred embodiments, the adaptive rate communication system conveys a signal from a transmitter to a receiver through a channel. The method includes computing an effective bit rate for the channel based on an available bit rate and an average effective information content at the receiver. The method further includes determining operating parameters for the transmitter and the receiver based on the effective bit rate and a percentage of speech in the received signal. The system transmits the operating parameters from the receiver to the transmitter for use in subsequent communications of the signal from the transmitter to the receiver.

The present invention also provides in the preferred embodiments a system and method to control bit rates and modulation for a transmitter based on changing channel conditions. The present invention also provides a system and method for allocating bits for error coding when a predetermined noise level is detected in a communication channel. The present invention also provides a system and method to adjust a modulation rate for a modulator when a bit-error-rate for a receiver compares to a threshold for a bit-error-rate. The present invention provides a system and method to provide graceful degradation for a low rate speech coder when a predetermined noise threshold is determined for a channel. The present invention also provides a system and method wherein a transmitter conveys a signal at a predetermined power level.

Figure 1:
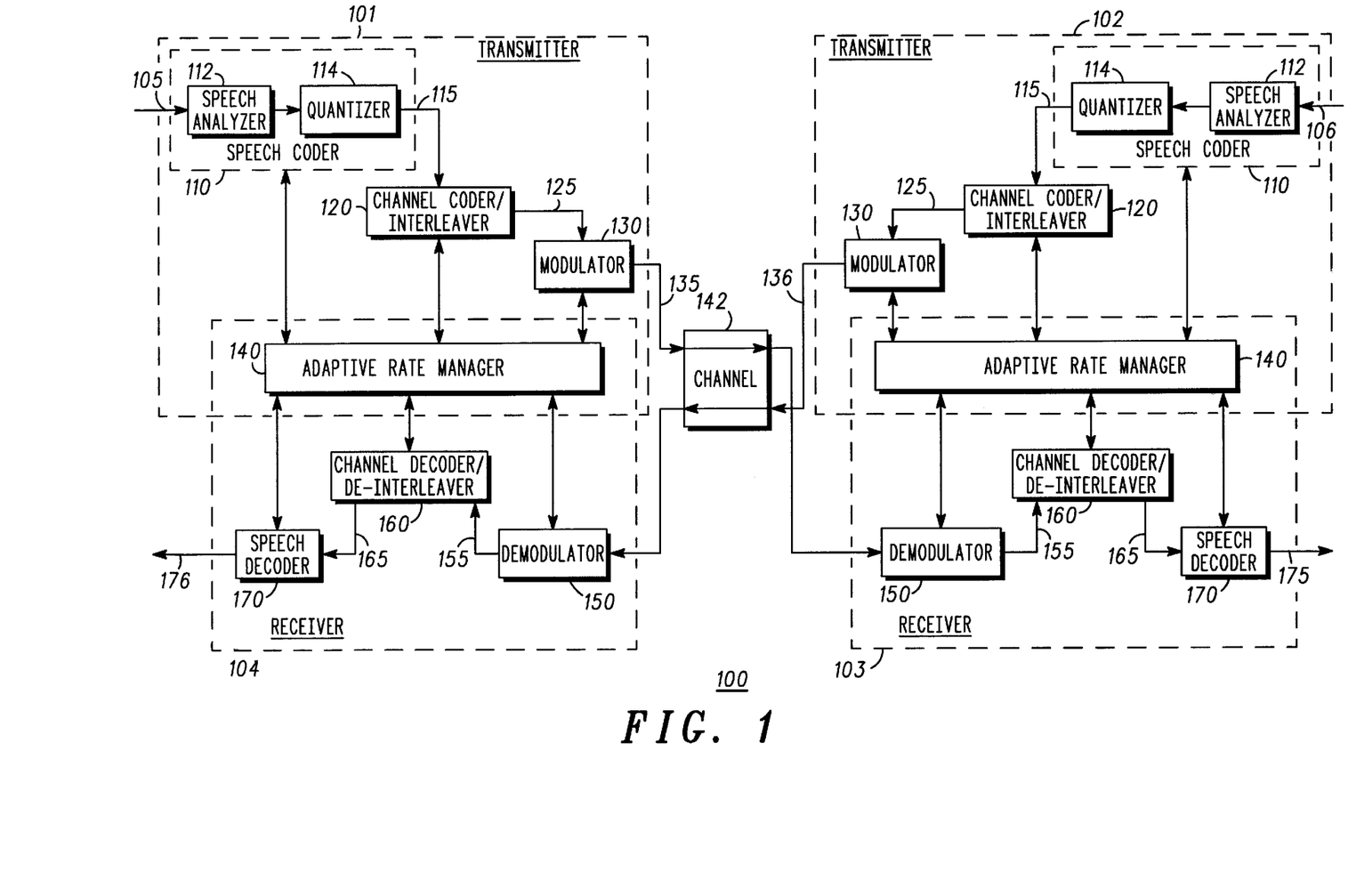
FIG. 1 shows a simplified block diagram for an adaptive rate communication system in accordance with a preferred embodiment of the present invention.

FIG. 1 shows a simplified block diagram for an adaptive rate communication system in accordance with a preferred embodiment of the present invention. In a preferred embodiment of the present invention, an adaptive rate communication system 100 includes transmitters 101–102 and receivers 103–104 coupled through channel 142.

Transmitters 101–102 generally include speech coder 110, channel coder 120, modulator 130, and adaptive rate manager 140. Speech coder 110 preferably receives digitized speech signals 105–106 and generates quantized speech parameters signal 115. Quantized speech parameters signal 115 is subsequently received by channel coder 120. Channel coder 120 preferably adds error coding information to quantized speech parameters signal 115 to produce protected speech signal 125 that is subsequently received by modulator 130. Modulator 130 preferably modulates protected speech signal 125 to produce modulated speech signals 135–136. Modulated speech signals 135–136 are conveyed to receivers 103–104, respectively, through channel 142. After modulated speech signals 135–136 are conveyed through channel 142 to receivers 103–104, signals 135–136 are titled received signals.

Speech coder 110 primarily determines speech parameters based on speech signals 105–106 and the operating parameters. In a preferred embodiment, speech coder 110 is further comprised of speech analyzer 112 and quantizer 114.

Speech analyzer 112 receives operating parameters, for example, speech coder bit rate, to determine speech parameters (e.g., voicing, pitch, energy, line spectral frequencies, excitation) for each superframe determined from speech signals 105–106. In a preferred embodiment, a superframe is between 1 to 8 frames of digitized speech, each frame representing between, for example, 10 and 40 milliseconds (ms) of digitized speech, and the beginning of each frame separated by, for example, 10 to 30 ms.

Speech analyzer parameters may be organized for bit rates of, for example, 300, 450, 600, 1200, 1800, 2400, 4800, 9600, and 19200 bits per second (bps). Each bit rate preferably makes use of a superframe structure, for example, 4 to 8 frames per superframe. When lower bit rates are determined for speech analyzer 112, a superframe, with its attendant delays, is needed because of a coding gain obtained by taking advantage of the temporal redundancy in speech. Few bits per frame are available at, for example, 300, 450 and 600 bps to produce intelligible speech without a superframe structure. In a preferred embodiment, this constrains higher bit rates to have a delay similar to that for lower bit rates. So, a superframe structure at higher bit rates may be used to take advantage of a temporal redundancy in a superframe. Therefore, speech analyzer 112 preferably uses temporal vector quantizers for pitch, energy and spectral coding, since pitch, energy, and the spectrum change relatively slowly in time. Using this method, bits unused for speech analysis, even at higher bit rates, may be applied to, for example, excitation coding.

In a preferred embodiment, speech analyzer 112 may be organized as follows: pitch synchronous linear predictive coefficients (PSELP) for bit rates of 300 and 450 bps, PSELP with unvoiced excitation coding for 600 and 1200 bps, and residual excited PSELP (REPSELP) for 1800, 2400, 4800, 9600 and 19200 bps.

Preferably, for bit rates at and below 1200 bps, binary voicing, pitch, energy and the spectrum are characterized. For 600 and 1200 bps, an intermediate implementation adds additional bits to characterize the envelope of energy found in the residual excitation of unvoiced frames to improve the intelligibility of consonants. For 1800 bps and above, voicing, mixed voicing, pitch, energy, the spectrum and the residual excitation are characterized. Preferably, at 1800 and 2400 bps, one additional bit per frame is allocated to characterize mixed voicing that is generally used to indicate the presence of additional randomness in the excitation. Above 2400 bps, autocorrelation coefficients of a three tap pitch filter may be characterized with additional mixed voicing bits. A pitch filter further "whitens" a residual excitation so that it may be more efficiently quantized. Preferably, a residual excitation is characterized in a baseband of a frequency domain using vector quantization for segments of residual magnitudes. The frequency range of the segments and the definition of the baseband/highband boundary change for each of the bit rates.

In a preferred embodiment, for each bit rate to produce the same delay for speech coding, bit rates at 4 frames per superframe for quantizing purposes process 2 superframes in both transmitter and receiver to produce a delay that is longer than would otherwise be needed but similar to that for lower bit rates. For example, an algorithmic delay produced by 8 frames per superframe and 240 samples per frame may be 0.51 seconds.

Example speech analyzer parameters for a speech analyzer in accordance with the preferred embodiment of the present invention, and operating at a bit rate range of 300–19200 bps are, for example, frames per superframe (SF)=4 to 8, bits per SF=72 to 2304, samples per SF=240, binary voicing bits per SF=3 to 6, mixed voicing bits per SF=0 to 24, pitch gain bits per SF=5 to 7, pitch shape bits per SF=2 to 8, energy gain bits per SF=6, energy shape bits per SF=5 to 11, unvoiced segments per frame=1 to 3, unvoiced segment bits per SF=0 to 16, excitation bits per SF=0 to 2116, average excitation bits per frame 0 to 529, spectrum bits per SF=38 to 120, average spectrum bits per frame 4.75 to 30, spectral category bits per SF=4–8, and synchronization bits per SF 0 to 4.

In another embodiment, a more limited range of bit rates for a speech analyzer are, for example, 600, 1200, 1800, 2400, 4800, 9600, and 19200 bps, when the lower bit rates described above are unnecessary and the delay associated therewith is undesirable. When the largest superframe size is 4 frames as described for the sample the delay may be, for example, 0.27 seconds.

In another embodiment, an even more limited range of bit rates for a speech analyzer are, for example, 4800, 9600, and 19200 bps. A frame size may be specified as 180 samples instead of 240 samples and no superframe structure is needed because there are enough bits at these rates that the longer frame size and use of temporal redundancy in quantization are not needed. The delay for this embodiment may be, for example, 0.0675 seconds.

Quantizer 114 performs a vector quantizer operation for the speech parameters and determines a sequence of bits to represent the speech parameters. Preferably, the speech parameters generated by speech analyzer 112 are quantized using a vector quantizer based on the speech coder bit rate. Vector quantizers are preferably interpolated (spectral parameters from adjacent frames of speech), 16-bit delta quantizers (that characterize spectral change from a previous frame), and vector quantizers that operate on each set of speech parameters separately. Examples of these vectors quantizers may be, 5-bit, 7-bit, 9-bit, 8-bit, 10-bit, 16-bit, 18-bit, 20-bit, 24-bit, 26-bit, 30-bit, and 32-bit vector quantizers.

In a preferred embodiment, voicing and mixed voicing parameters are quantized using simple N-dimensional vector quantizers, where N is the number of frames per superframe. Preferably, pitch and energy parameters are quantized using gain/shape vector quantizers, wherein the average value in the N length vector of the parameter is used to normalize the vector before it is scalar quantized. Preferably, the average value or gain is then scalar quantized. N is preferably in the range of 1 to 8 as discussed above.

In a preferred embodiment, a spectral quantizer determines a list of potential spectral quantizer schemes for each frame in a superframe by taking advantage of adaptive coding on the rate distortion bound (ACRDB). In other words, potential quantizer schemes may be selected for each bit rate. For example, at 600 bps, a potential spectral quantizing scheme may be to quantize with 10, 20 or 30 bits per frame, or to interpolate over a frame. Preferably, the total number of bits allowed for quantizing each superframe is 40 bits. With this scheme, interpolation may be chosen for frames where a vocal track is changing slowly and smoothly. For example, an optimal combination of quantizers for a 4 frame superframe might be: interpolation, 20 bits, interpolation, 20 bits. In a preferred embodiment, this is one of 32 combinations that could be specified by the 5 bit spectral category parameter for a 600 bps speech coder.

Channel coder 120 performs error coding for the sequence of bits determined by quantizer 114. In a preferred embodiment, channel coder 120 adds FEC coding to and performs an interleaver operation on the sequence of bits. Preferably channel coder 120 generates a protected signal comprising the sequence of bits and error coding information.

Modulator 130 transmits the protected signal, for example, signal 135, to a receiver through channel 142. In a preferred embodiment, modulator 130 modulates the protected signal and, when needed, operating parameters to the receiver. For example, when receiver 103 conveys new operating parameters to transmitter 101, adaptive rate manager 140 for transmitter 101 signals acceptance of the new operating parameters by attaching the new operating parameters to the protected signal and conveying the protected signal and the new operating parameters to receiver 103. Prior to conveying the new operating parameters to receiver 103, transmitter 101 elements are responsive to the new operating parameters. Again, for example, when receiver 103requests a new speech coder bit rate, transmitter 101 conveys the new speech coder bit rate as part of signal 135 subsequent to speech coder 110 determining speech parameters at the new speech coder bit rate.

In a preferred embodiment, transmitter 102 performs operations similar to transmitter 101. Additionally, transmitter 102 communicates with receiver 104 in a manner similar to communications between transmitter 101 and receiver 103.

Receivers 103–104 preferably include demodulator 150, channel decoder 160, speech decoder 170, and adaptive rate manager 140. Preferably, demodulator 150 demodulates signals 135–136 and generates demodulated signal 155. Demodulated signal 155 is similar to protected speech signal 125 with errors induced because of noise in channel 142. When no errors are induced because of noise in channel 142, demodulated signal 155 is preferably similar to protected speech signal 125. Channel decoder 160 receives demodulated signal 155 and performs error detection and correction on the signal. Channel decoder 160 generates protected speech parameters that are processed by speech decoder 170 to produce synthesized speech at outputs 175–176.

Demodulator 150 includes means for estimating a bit-error-rate for signal 155, and means for computing a bit-error-rate based on the estimated bit-error-rate and a predetermined channel code correction factor (discussed below). Demodulator 150 demodulates signals 135–136 based on operating parameters predetermined during initialization or in accordance with operating parameters received as part of signals 135–136. In the embodiment where demodulator 150 is responsive to operating parameters received as part of signals 135–136, a field that represents the modulation strategy, regardless of the present modulation strategy, is interpreted by demodulator 150. Preferably, demodulator 150 includes means for estimating a signal-to-noise ratio for signal 155. Channel decoder 160 receives signal 155 via demodulator 150. Channel decoder 160 corrects bit errors in signal 155 to produce error corrected signal 165. Preferably, channel decoder 160 is responsive to an operating parameter that determines the channel decoder it rate. Operating parameters for channel decoder 160 are predetermined during initialization or in accordance with operating parameters received as part of signal 155. In a preferred embodiment, channel decoder 160 performs channel FEC decoding and de-interleaver operations. Channel FEC decoding includes correction for bit errors based on a predetermined forward error correction operation. Channel decoder 160 also includes means for generating a bit-error-rate for signal 165.

Speech decoder 170 receives error corrected signal 165 to synthesize speech. In a preferred embodiment, speech decoder 170 is responsive to an operating parameter that determines a speech decoder bit rate. Operating parameters for speech decoder 170 are predetermined during initialization or in accordance with operating parameters received as part of signals 135–136. In a preferred embodiment, speech decoder 170 synthesizes speech based on speech parameters determined from error corrected signal 165.

Preferably, elements for transmitters 101–102 and elements for receivers 103–104 are responsive to operating parameters determined by an adaptive rate manager 140 associated therewith. Operating parameters comprise, for example, speech coder bit rate, channel coder bit rate, interleaver rate, modulation strategy (e.g., modulation type, and modulation rate), speech decoder bit rate, channel decoder bit rate, de-interleaver rate, and demodulation strategy.

Adaptive rate manager 140 generally includes one or more processors and memories (not shown). In a preferred embodiment, adaptive rate manager 140 stores a software program in the memory, wherein the software program determines operating parameters for transmitters 101–102 and receivers 103–104. Preferably, one adaptive rate manager 140 is coupled to each transmitter and receiver pair, for example, one adaptive rate manager 140 is coupled to transmitter 101 and receiver 104, and one is coupled to transmitter 102 and receiver 103. In another embodiment, adaptive rate manager 140 is implemented in hardware logic.

The processor included in adaptive rate manager 140 for receivers 103–104 computes an effective bit rate for channel 142 based on an available bit rate and average effective information content at the receiver. For example, the processor for receiver 103 determines new (e.g., changed) operating parameters for receiver 103 and transmitter 101 based on the effective bit rate and the percentage of speech in signal 135. The processor provides the new operating parameters as feedback to transmitter 101 through modulator 130 for transmitter 102. Transmitter 101 uses the operating parameters in subsequent communications of signal 135.

The processor for adaptive rate manager 140 further includes means for computing a capacity adjustment factor (discussed below) based on a signal-to-noise ratio for signals 135–136 and a predetermined signal-to-noise ratio, and means for determining average effective information content at receivers 103–104 for signals 135–136, respectively, based on the capacity adjustment factor.

Additionally, the processor of adaptive rate manager 140 equates a bit-error-rate for a receiver with a bit-error-rate generated at channel decoder 160 when the bit-error-rate at channel decoder 160 compares to a predetermined bit-error-rate. Also, the processor of adaptive rate manager 140 computes the average effective information content at a receiver based on a bit-error-rate generated at channel decoder 160.

The processor of adaptive rate manager 140 also compares source distortion for a signal (e.g., signals 135–136) with predetermined source distortion for a predetermined signal. For example, system 100 may transmit a predetermined signal from transmitter 101 to receiver 103. Adaptive rate manager 140 preferably determines source distortion between the received "predetermined" signal and a similar predetermined signal stored in the memory for adaptive rate manager 140. Based on this comparison, adaptive rate manager 140 determines source distortion for signal 135. The processor of adaptive rate manager 140 also computes a capacity adjustment factor based on the source distortion for signals 135–136 and the predetermined source distortion. The processor of adaptive rate manager 140 also determines average effective information content at a receiver based on a capacity adjustment factor.

Preferably, adaptive rate manager 140, for receiver 104, performs operations for receiver 104 and transmitter 102 that are similar to operations for receiver 103 and transmitter 101. Furthermore, adaptive rate manager 140 for receiver 104 performs operations for signal 136 for a reverse communication path.

Adaptive rate manager 140 for receivers 103–104 determines when elements for transmitters 101–102, respectively, are responsive to new operating parameters (e.g., speech coder bit rate, channel coder bit rate, interleaver rate, and/or modulation parameters/bit rate).

Figure 2:
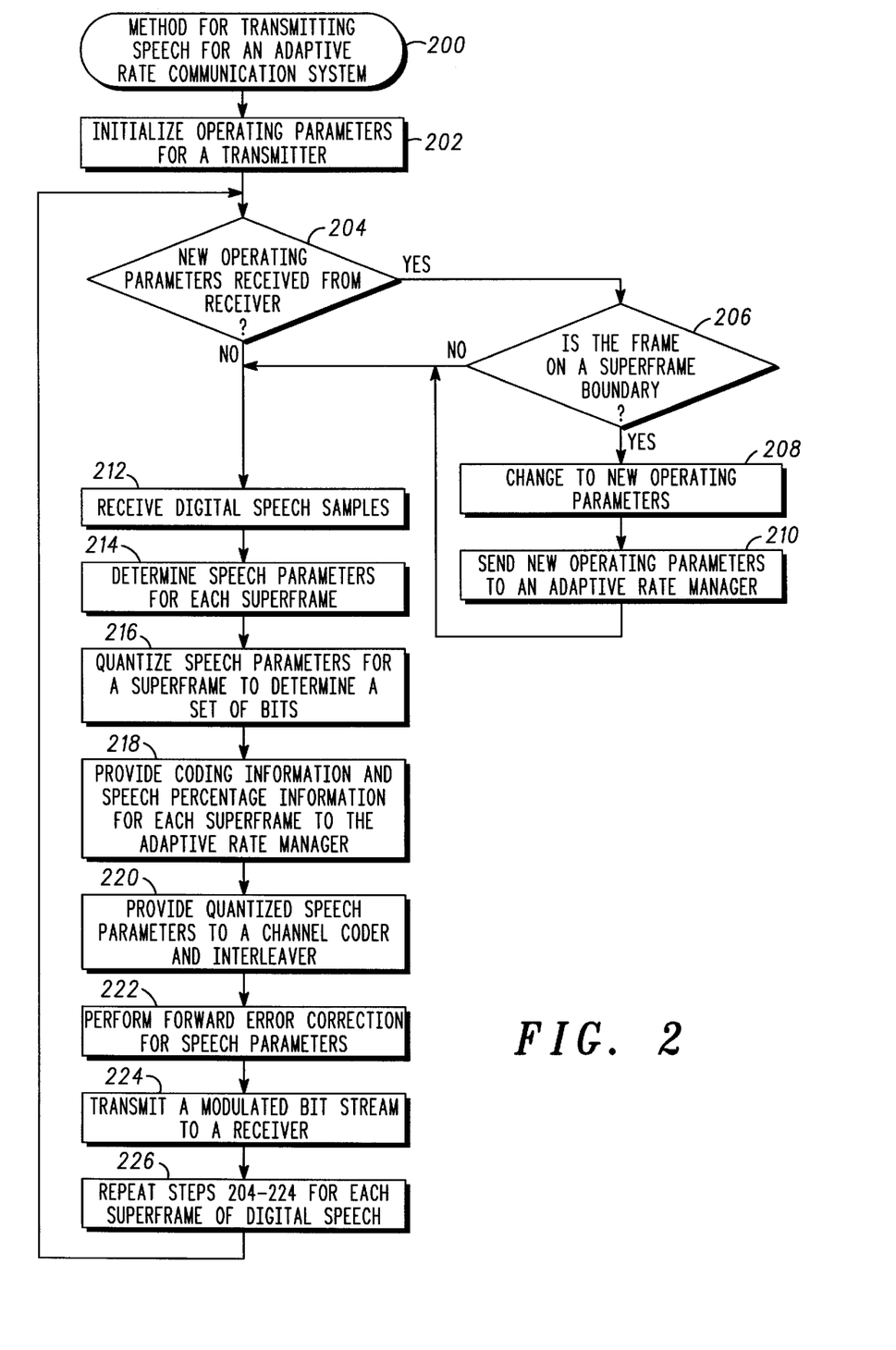
FIG. 2 shows a simplified flowchart for a procedure for transmitting speech for an adaptive rate communication system in accordance with a preferred embodiment of the present invention.

FIG. 2 shows a simplified flowchart for a procedure for transmitting speech for an adaptive rate communication system in accordance with a preferred embodiment of the present invention. In a preferred embodiment, procedure 200 is performed by a transmitter to transmit a signal to a receiver. Preferably, the transmitter and the receiver are responsive to operating parameters determined at the receiver. Transmitters 101–102 (FIG. 1) and receivers 103–104 (FIG. 1) are suitable for performing procedure 200.

In step 202, operating parameters for a transmitter are initialized. In a preferred embodiment, each element of the transmitter receives a set of operating parameters to perform initial operations. When an operating parameter, for example, a speech coder bit rate for a speech coder is at 1.8 kilobits per second (kbps), the speech analyzer parameters may be as follows: number of frames per superframe (SF)= 4, number of bits per SF=216, number of samples per SF=240, binary voicing bits per SF=4, mixed voicing bits per SF=4, pitch gain bits per SF=7, pitch shape bits per SF=8, energy gain bits per SF=6, energy shape bits per SF=11, unvoiced segments per frame=1, unvoiced segment bits per SF=0, excitation bits per SF=64, average excitation bits per frame=16, spectrum bits per SF=103, average spectrum bits per frame=26, spectral category bits per SF=4, and synchronization bits per SF=4.

In a preferred embodiment, an operating parameter for the quantizer may be, for example, a 16-bit delta quantizer to characterize the spectral change from the previous frame. Operating parameters for the channel coder may be, for example, a channel coder bit rate of one-half and a interleaver rate of 240 bits. An operating parameter for the modulator may be, for example, a modulation bit rate of 4.8 kbps.

In step 204, a check is performed to determine when new operating parameters are received from the receiver. When new operating parameters are received at the transmitter, step 206 is performed. Otherwise, step 212 is performed.

In step 206, a check is performed to determine when a frame is on a superframe boundary. When a frame is on a superframe boundary, step 208 is performed. Otherwise, step 212 is performed.

In step 208, the current operating parameters are changed to the new operating parameters. In a preferred embodiment, when the receiver conveys new operating parameters to the transmitter, the adaptive rate manager for the transmitter conveys the new operating parameters to the elements for the transmitter. The operating parameters are conveyed, for example, to the speech coder, channel coder, and modulator similar to that performed in step 202. Preferably, only new operating parameters that are different than current operating parameters are conveyed to the elements associated therewith.

In step 210, the new operating parameters are conveyed to the adaptive rate manager. In a preferred embodiment, the adaptive rate manager for the transmitter stores the new operating parameters and, in a subsequent step, conveys them to the modulator.

In step 212, digital speech samples are received. In a preferred embodiment, the speech analyzer receives digitized speech samples from a digitizing source. The speech analyzer organizes the speech samples into frames of digitized speech. Preferably, each frame represents, for example, between 10 and 40 milliseconds (ms) of digitized speech samples, and the beginning of each frame is separated by, for example, 10 to 30 ms.

In step 214, speech parameters for each superframe of speech are determined. In a preferred embodiment, the speech analyzer processes the speech samples as superframes of speech. As discussed above, a superframe is between 1 to 8 frames of digitized speech. Preferably, the speech analyzer receives operating parameters, for example, operating parameters discussed in steps 202–204, to determine speech parameters (e.g., voicing, pitch, energy, line spectral frequencies, excitation) for each superframe. Speech parameters are determined from a speech signal, for example, speech signal 105 (FIG. 1).

In step 216, speech parameters for a superframe are quantized to determine a set of bits. In a preferred embodiment, the speech parameters determined in step 214 are quantized using a vector quantizer. For example, for a speech coder bit rate of 1.8 kbps, a 16-bit delta quantizer that characterizes the spectral change from a previous frame of speech quantizes each frame within the superframe.

In step 218, coding information and a percentage of speech information in each superframe are provided to an adaptive rate manager. In a preferred embodiment, the speech coder bit rate and percentage of speech information determined by the speech analyzer are provided to the adaptive rate manager. When the speech coder bit rate and the percentage of speech information are different from previously transmitted values, the adaptive rate transmitter conveys the values as part of a signal, for example, signals 135–136 (FIG. 1).

In step 220, quantized speech parameters are provided to a channel coder and interleaver. In a preferred embodiment, the speech coder provides a bit stream of quantized speech parameters to the channel coder.

In step 222, forward error correction is performed for the speech parameters. In a preferred embodiment, forward error coding and interleaving are performed for the quantized speech parameters. As discussed above, for example, forward error coding at one-half rate and interleaver rate of 204 bits are suitable for a speech coder bit rate of 1.8 kbps.

In step 224, a modulated bit stream is transmitted to a receiver. In a preferred embodiment, the adaptive rate manager combines the protected speech parameters and new operating parameters and conveys them to a modulator for transmission to a receiver via a modulated signal. Examples of modulated signals are, among other things, binary phase shift keying (BPSK), quadrature phase shift keying (QPSK), quadrature amplitude modulation (QAM), frequency shift keying (FSK), Gaussian minimum shift keying (GMSK), amplitude shift keying (ASK), pulse amplitude modulation (PAM), and pulse position modulation (PPM). The modulation bit rate is determined as an operating parameter for the modulator.

In step 226, steps 204–224 are repeated for each superframe representing a speech signal. In a preferred embodiment, steps 204–224 are performed for each digitized speech signal received by the speech analyzer.

Figure 3:
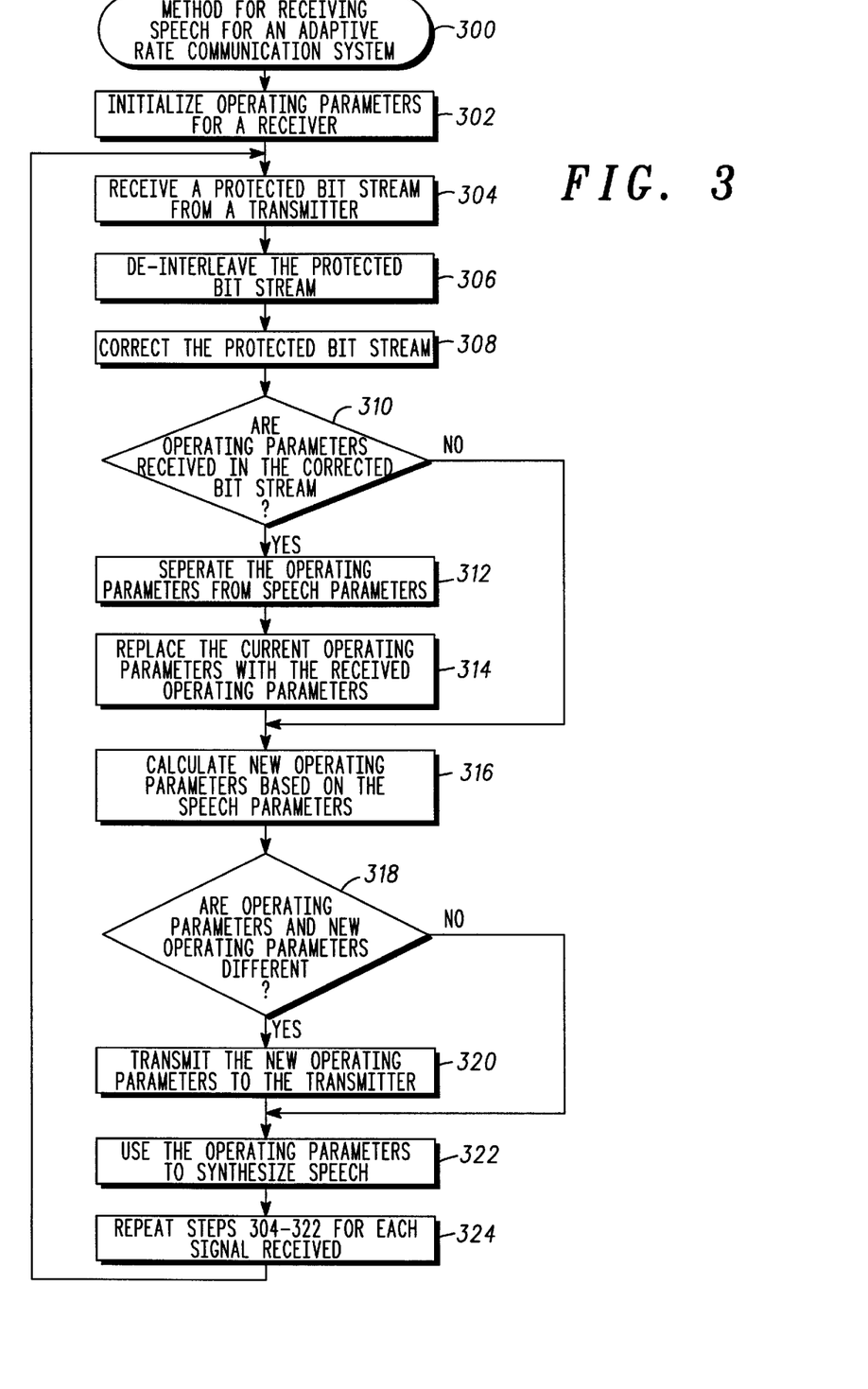
FIG. 3 shows a simplified flowchart for a procedure for receiving speech for an adaptive rate communication system in accordance with a preferred embodiment of the present invention.

FIG. 3 shows a simplified flowchart for a procedure for receiving speech for an adaptive rate communication system in accordance with a preferred embodiment of the present invention. In a preferred embodiment of the present invention, procedure 300 is performed by a receiver to receive a signal conveyed from a transmitter. Preferably, the transmitter and the receiver are each responsive to operating parameters determined at the receiver. Receivers 103–104 (FIG. 1) are suitable for performing procedure 300.

In step 302, operating parameters for a receiver are initialized. In a preferred embodiment, operating parameters are initialized for a receiver similar to that for operating parameters initialized for the transmitter, as discussed in step 202 (FIG. 2). For example, operating parameters for the speech decoder are initialized similar to operating parameters for the speech coder. Operating parameters for the channel decoder are initialized similar to operating parameters for the channel coder, and operating parameters for the demodulator are initialized similar to operating parameters for the modulator.

In step 304, a protected bit stream is received from a transmitter. In a preferred embodiment, a demodulator demodulates the protected bit stream from the transmitter to regenerate the protected bit stream. The demodulated protected bit stream is provided to the channel decoder. In a preferred embodiment, the demodulator determines the modulation strategy based on a modulation independent field determined from the protected bit stream.

In step 306, the protected bit stream is de-interleaved. In a preferred embodiment, the channel decoder de-interleaves the protected bit stream to produce another protected bit stream.

In step 308, the protected bit stream is corrected. In a preferred embodiment, forward error correction decoding is performed for the protected bit stream determined in step 306. The result is a set of speech parameters and, when received, new operating parameters.

In step 310, a check is performed to determine when operating parameters are received in the protected bit stream. In a preferred embodiment, when new operating parameters are transmitted from the transmitter to the receiver, the new operating parameters represent operating parameters previously conveyed from and determined by the receiver. The adaptive rate manager preferably evaluates a predetermined set of bits in the received signal to determine when new operating parameters are transmitted. When new operating parameters are transmitted, step 312 is performed. Otherwise, the received signal is primarily comprised of speech parameters, and step 316 is performed.

In step 312, the operating parameters are separated from speech parameters. In a preferred embodiment, the adaptive rate manager separates the operating parameters from the speech parameters.

In step 314, the current operating parameters are replaced with the received operating parameters. In a preferred embodiment, the adaptive rate manager replaces the current operating parameters with the new operating parameters received from the transmitter. Preferably, only those operating parameters that are different than the current operating parameters are replaced. For example, when a new number of de-interleaver bits is received at the receiver, the adaptive rate manager for the receiver provides the new number of de-interleaver bits to the channel decoder.

Step 316 calculates new operating parameters based on the speech parameters. When step 316 is complete, step 318 is performed.

In step 318, a check is performed to determine when the calculated operating parameters compare to the current operating parameters. In a preferred embodiment, the current operating parameters are compared to the operating parameters calculated in step 316. When a calculated operating parameter is different than a current operating parameter, step 320 is performed. Otherwise, step 322 is performed.

In step 320, the operating parameters are transmitted to the transmitter. In a preferred embodiment, the adaptive rate manager for the receiver provides, indirectly, operating parameters to the transmitter that conveyed a signal to the receiver. For example, when the receiver is receiver 103 (FIG. 1), adaptive rate manager 140 for receiver 103 provides operating parameters to transmitter 102. Transmitter 102 conveys the operating parameters to receiver 104. Adaptive rate manager 140 for receiver 104 then provides the operating parameters to the elements for transmitter 101 (e.g., speech coder 110, channel coder 120, and modulator 130). Preferably, the operating parameters from receiver 103 to transmitter 101 are for use in subsequent communications of signal 135 from transmitter 101 to receiver 103.

In step 322, the operating parameters are used to synthesize the speech parameters. In a preferred embodiment, the speech decoder performs speech synthesis based on the speech parameters determined in steps 310–312. Preferably, the speech decoder is responsive to the operating parameters for the speech decoder. Operating parameters for the speech decoder are similar to operating parameters for the speech coder as discussed above, for example, step 202 (FIG. 2).

In step 324, steps 304–322 are repeated for each signal received. In a preferred embodiment, steps 304–322 are performed for each signal received by the receiver, for example, receiver 103 (FIG. 1).

Figure 4:
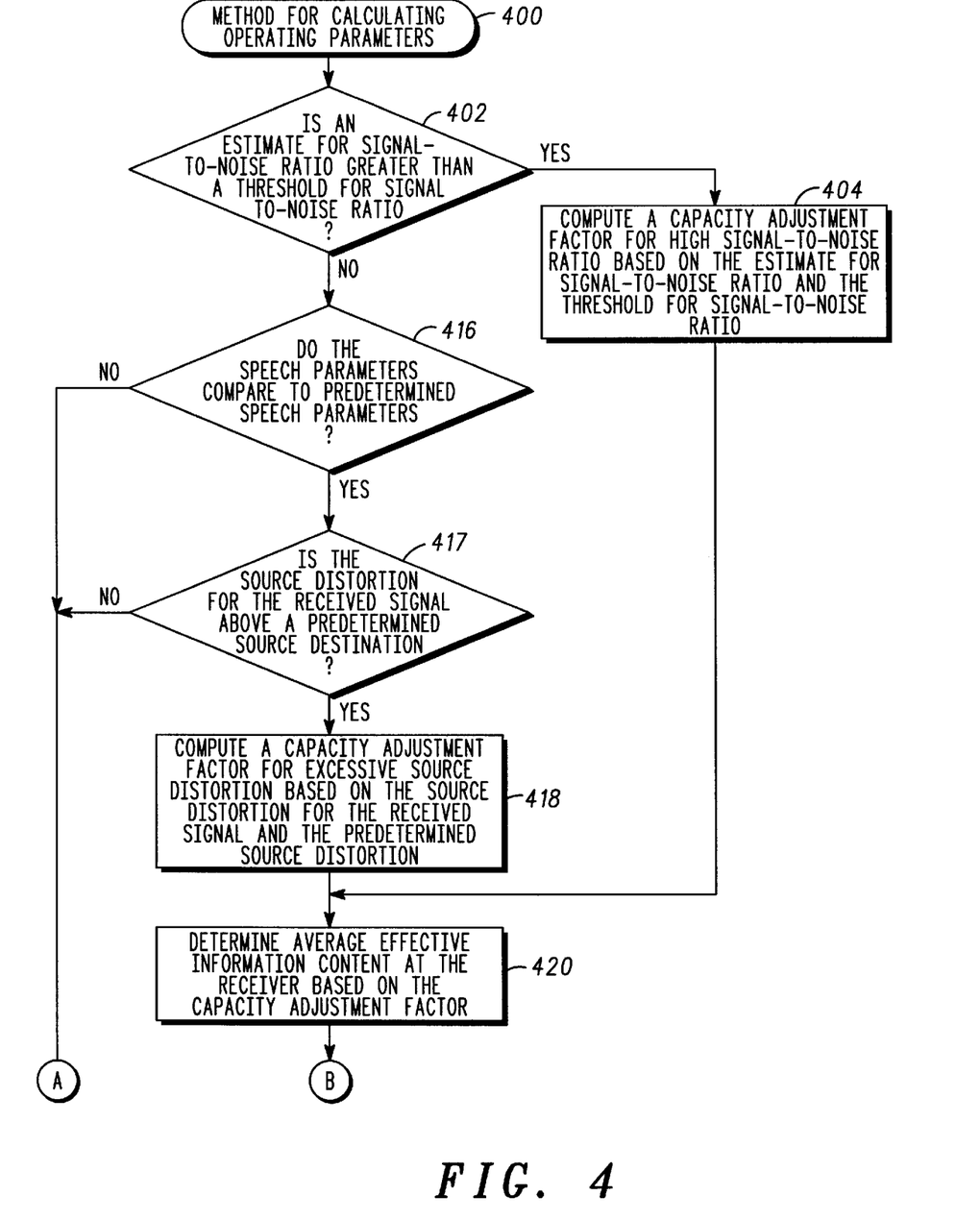
FIG. 4 and FIG. 5 show a simplified flowchart for a procedure for calculating operating parameters for an adaptive rate communication system in accordance with a preferred embodiment of the present invention.
Figure 5:
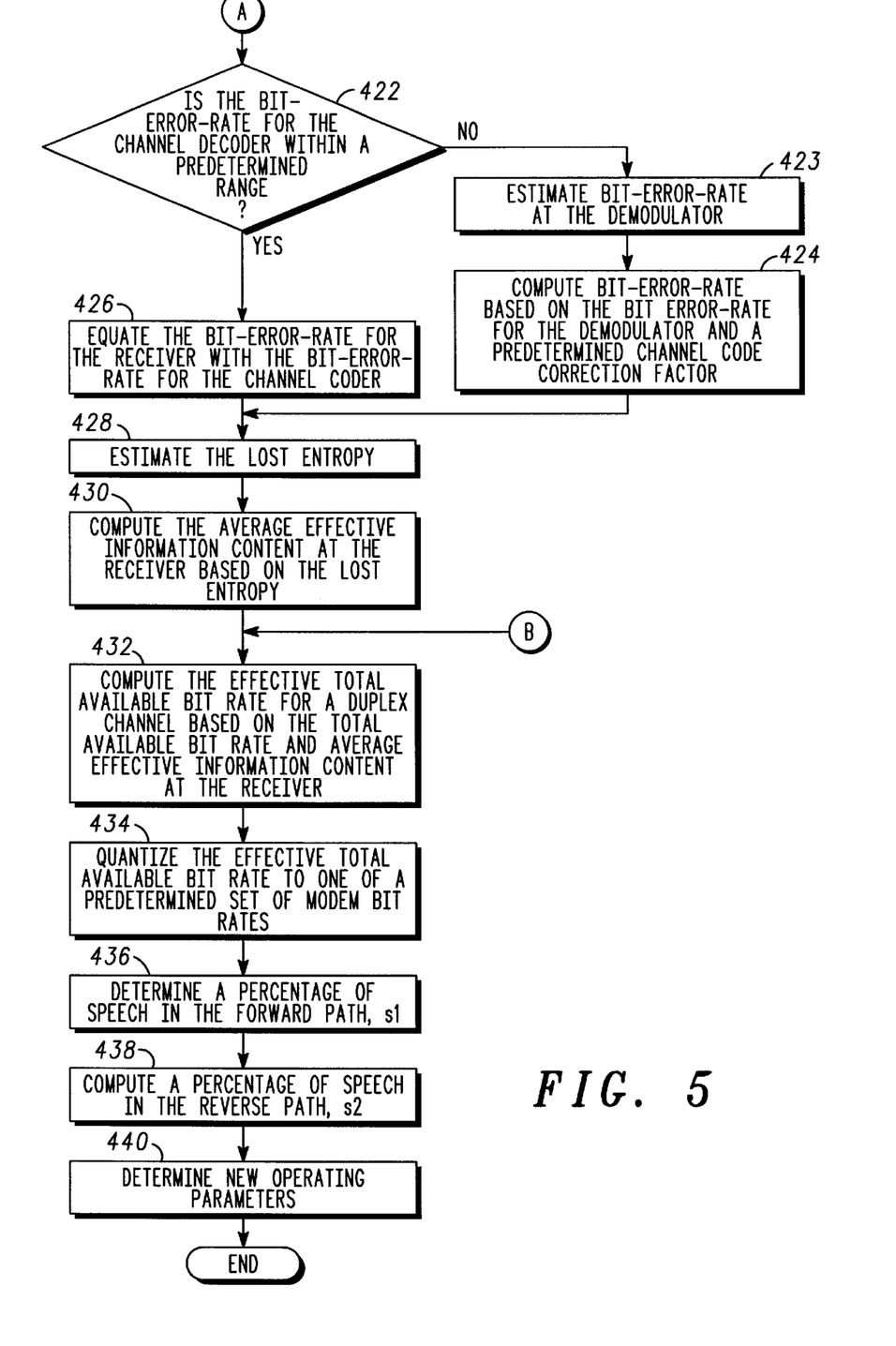

FIG. 4 and FIG. 5 show a simplified flowchart for a procedure for calculating operating parameters for an adaptive rate communication system in accordance with a preferred embodiment of the present invention. In a preferred embodiment, procedure 400 is performed by a receiver to calculate operating parameters for an adaptive rate communication system based on a signal conveyed from a transmitter to the receiver. Preferably, the operating parameters determine the communication rate for the adaptive rate communication system. Procedure 400 is suitable for performing step 316 of procedure 300.

In step 402, a comparison between an estimate for signal-to-noise ratio and a threshold for a signal-to-noise ratio is performed. In a preferred embodiment, a demodulator for a receiver performs a signal-to-noise estimate based on a received signal. The estimated signal-to-noise ratio is compared to a predetermined signal-to-noise ratio. Preferably, the predetermined signal-to-noise ratio is determined experimentally and represents a "high" value for a signal-to-noise ratio with respect to expected channel conditions. When the estimated signal-to-noise ratio is greater than the predetermined signal-to-noise ratio, step 404 is performed. Otherwise, step 416 is performed.

In step 404, a capacity adjustment factor is computed. In a preferred embodiment, a capacity adjustment factor is computed based on the estimate for the signal-to-noise ratio and the signal-to-noise ratio experimentally determined in step 402. The capacity adjustment factor (CAF) may be computed, for example, as shown in equation (eqn.) 1, $$CAF = (SNR_{est}/SNR_{high}),\qquad\text{(eqn. 1)}$$

wherein $SNR_{est}$ is the signal-to-noise estimate and $SNR_{high}$ is a signal-to-noise ratio that is experimentally determined. When step 404 is complete, step 420 is performed.

In step 416, the speech parameters are compared to predetermined speech parameters. In a preferred embodiment, the transmitter periodically conveys predetermined speech parameters. Preferably, the adaptive rate manager for the receiver determines when the speech parameters received compare to predetermined speech parameters. When the speech parameters compare, step 417 is performed. Otherwise, step 422 is performed.

In step 417, a check is performed to determine when the source distortion for the received, "predetermined" speech parameters (e.g., signal) compare to a predetermined source distortion. In a preferred embodiment, the predetermined source distortion is determined experimentally and represents a "high" value for a source distortion with respect to expected channel conditions. Preferably, when source distortion for a received signal is above a predetermined source distortion level, step 422 is performed. Otherwise, step 418 is performed.

In step 418, a capacity adjustment factor is computed. In a preferred embodiment, a capacity adjustment factor is computed based on the source distortion associated with the received, predetermined speech parameters (e.g., signal) and the predetermined source distortion. The capacity adjustment factor (CAF) may be computed, for example, as shown in equation eqn. 2, $$CAF = (SD_{high}/SD_{measured})\qquad\text{(eqn. 2)}$$

wherein $SD_{measured}$ is the source distortion based on the received, predetermined signal and $SD_{high}$ is a source distortion that is experimentally determined.

In step 420, the average effective information content at the receiver is determined. In a preferred embodiment, the average effective information content at the receiver, $H_{eff}$, is equated to the capacity adjustment factor determined in equation 1 or 2, dependent on the step performed prior to step 420. When step 420 is complete, step 432 is performed.

In step 422, a check is performed to determine when a bit-error-rate for a channel decoder is within a predetermined range. The channel coder bit-error-rate, $BER_{channel\_coder}$, is preferably determined based on a number of corrected bit errors for the received speech parameters, for example, corrected bit errors in signal 165 (FIG. 1). In a preferred embodiment, a channel decoder bit-error-rate may fail to be within a predetermined range for at least two conditions. One condition, for example, is when channel conditions are "good" and channel coding is not needed to protect speech parameters and therefore, no bit-error-rate is associated with the channel decoder. Another condition is when the type of channel decoding fails to provide a means to determine a bit-error-rate. Preferably, the predetermined range for a bit-error-rate is determined experimentally. When the bit-error-rate for the channel decoder fails to compare to a predetermined range, step 423 is performed. Otherwise, step 426 is performed.

In step 423, a bit-error-rate is estimated at the demodulator. In a preferred embodiment, the demodulator estimates a bit-error-rate based on the signal generated at the demodulator, for example, signal 155 (FIG. 1). Bit-error-rate may be estimated at the demodulator, for example, by performing a "Q" function on the signal-to-noise ratio. An example Q function for binary phase shift key (BPSK) modulation is shown in eqn. 3, $$BER_{demodulator} = Q\left(\sqrt{2\frac{E_b}{N_0}}\right),\qquad\text{(eqn. 3)}$$

wherein $BER_{demodulator}$ represents the bit-error-rate generated at the demodulator, Q ( ) represents the function $$\frac{1}{2}\mathrm{ERFC}\left(\sqrt{2\frac{E_b}{N_0}}\bigg/\sqrt{2}\right).$$

ERFC represents the well known "complementary error function", $E_b$ represents the bit energy, and $N_0$ represents the noise spectral density.

In step 424, a bit-error-rate is computed. In a preferred embodiment, the bit-error-rate is computed based on a bit-error-rate estimated at the demodulator and a channel code correction factor, $K_c$. The bit-error-rate estimated at the demodulator is determined in step 423. The channel code correction factor is preferably predetermined. For example, for $BER_{demodulator}$ values of 0.15, 0.01, 0.005, and 0.0001, $K_c$ values may be 1.2, 5, 10, and 100, respectively. Bit-error-rate may be computed, for example, as shown in eqn. 4, $$P_B = BER_{demodulator}/K_c,\qquad\text{(eqn. 4)}$$

wherein $BER_{demodulator}$ and $K_c$ are described above and $P_B$ represents a corrected bit-error-rate for the signal generated by the demodulator. When step 424 is complete, step 428 is performed.

In step 426, equate the bit-error-rate for the receiver with the bit-error-rate for the channel decoder. In a preferred embodiment, when the bit-error-rate generated at the channel decoder is available, the bit-error-rate for receiver is equated to that value. Preferably, the bit-error-rate is equated to the bit-error-rate determined in step 422. In other words, $P_B$ (e.g., bit-error-rate for the receiver) is equated to $BER_{channel\_coder}$ (e.g., bit-error-rate generated at the channel coder).

In step 428, lost entropy is estimated. In a preferred embodiment, the lost entropy because of noise in the channel is estimated based on the bit-error-rate, for example for a binary symmetric channel, as shown in eqn. 5, $$H(x|y) = -[((1-P_B)\log_2(1-P_B)) + (P_B \log_2(P_B))], \quad (\text{eqn. 5})$$

wherein $H(x|y)$ represents the lost entropy because of noise in the channel, and $P_B$ represents the bit-error-rate at the receiver as determined in steps 424 and 426. $H(x|y)$ is preferably read as "H of x given y", wherein x represents a signal transmitted from a transmitter and y represents the signal x "as received" at a receiver.

In an embodiment where channels are not approximated by a binary symmetric channel model, a similar calculation for $H(x|y)$ is used to estimate the lost entropy.

In step 430, the average effective information content at the receiver is computed based on the lost entropy because of noise in the channel. In a preferred embodiment, the average effective information content at the receiver, $H_{eff}$, is based on the lost entropy, $H(x|y)$ determined in step 428. Accordingly, $H_{eff}$ is based on the bit-error-rate at the receiver as determined in steps 424 and 426. In equation form, $H_{eff}$ may be determined, for example, by eqn. 6, $$H_{eff} = 1 - H(x|y), \quad (\text{eqn. 6})$$

wherein $H(x|y)$ represents the lost entropy determined in step 428. Preferably, $H(x|y)$ represents lost entropy due to bit errors entering the receiver.

In step 432, the effective total available bit rate for a duplex channel is computed. In a preferred embodiment, the effective total available bit rate at the transmitter, $R_{eff}$, is determined based on $H_{eff}$, as determined in steps 420 and 430, and the modulation rate, $R_M$, associated with a previously received signal. $R_M$ is preferably one-half the total available channel bit rate for forward and reverse path signals that are communicated through a channel, for example, forward path signal 135 and reverse path signal 136 through channel 142 (FIG. 1). The effective total available bit rate for a duplex channel may be computed, for example, as shown in eqn. 7, $$R_{eff} = R_M H_{eff}. \quad (\text{eqn. 7})$$

In step 434, the effective total available bit rate is quantized to one of a predetermined set of modem bit rates. In a preferred embodiment, a modem, for example modulator 130 (FIG. 1), modulates a signal at discrete bit rates, for example, 19.2 kbps, 9.6 kbps, 4.8 kbps, 2.4 kbps, 1.8 kbps, 1.2 kbps, 0.6 kbps, 0.45 kbps, and 0.3 kbps. When, in step 432, an effective total available bit rate, $R_{eff}$, is determined, a discrete modulation bit rate less than or equal to $R_{eff}$ is determined as a communication rate. So, for example, when $R_{eff}$ is 10.8 kbps, the quantized modem bit rate may be determined to be 9.6 kbps. Preferably, the quantized modem bit rate is symbolized as $R_M$.

In step 436, a percentage of speech in the forward path is determined. In a preferred embodiment, the percentage of speech in the forward path is determined by an adaptive rate manager in a transmitter based on inputs from a speech coder and a channel coder. Preferably, the adaptive rate manager for the transmitter attaches the percentage of speech in the forward path direction with speech parameters, and when needed, operating parameters and communicates them to the receiver. The forward path is preferably determined by communications from a transmitter to a receiver that initiate communications, for example, transmitter 101 and receiver 103 (FIG. 1). Preferably, a percentage of speech in the forward path direction is symbolized as $S_{forward}$.

In step 438, a percentage of speech in the reverse path is determined. In a preferred embodiment, the percentage of speech in the reverse path is determined by an adaptive rate manager in a transmitter based on inputs from a speech coder and a channel coder. Preferably, the adaptive rate manager for the transmitter attaches the percentage of speech in the reverse path direction with speech parameters, and when needed, operating parameters and communicates them to a receiver. The reverse path is preferably determined by communications from a transmitter to a receiver that communicate after another transmitter and receiver have initiated communication. For example, in FIG. 1, communication between transmitter 102 and receiver 104 represents reverse path communications after transmitter 101 and receiver 103 have initiated communication. Preferably, a percentage of speech in the reverse path direction is symbolized as $S_{reverse}$.

In step 440, new operating parameters are determined. In a preferred embodiment, new operating parameters are determined for a transmitter and a receiver based on channel conditions. Preferably, the receiver determines the new operating parameters primarily based on noise present in a channel between the transmitter and the receiver. As discussed above, among other things, operating parameters include, for example: speech coder bit rate, channel coder bit rate, interleaver rate, modulation strategy (e.g., modulation type, and modulation rate), speech decoder bit rate, channel decoder bit rate, de-interleaver rate, and demodulation strategy. Preferably, when speech coder bit rate, $R_{SP}$, is determined, a similar value for speech decoder bit rate is determined. Also, similar relationships exist between channel coder and decoder bit rates, $R_{CC}$, interleaver and de-interleaver rate, $R_I$, and modulator and demodulator bit rates, $R_M$. In another embodiment, the operating parameters are determined independently based on conditions at a receiver associated therewith.

In a preferred embodiment, modulator and demodulator bit rates, $R_M$, are determined as shown in step 434. Channel coder and decoder bit rates, $R_{CC}$, are preferably predetermined based on the modulation bit rate and are ordinarily in a range near one-half. Speech coder and decoder bit rates are preferably determined based on the percentage of speech in the forward and reverse paths, the modulator bit rate, and channel coder rate. An example calculation to determine speech coder and decoder bit rates, $R_{SP}$ is shown in eqn. 8, $$R_{SP} = \left(\frac{s_1}{s_1 + s_2}\right) R_M R_{CC}, \quad (\text{eqn. 8})$$

wherein $S_1$ and $S_2$ are determined in steps 436 and 438, respectively, $R_M$ is defined in step 434, and $R_{CC}$ is defined above. An example calculation to determine interleaver and de-interleaver rate, $R_{I,NEW}$, is shown in eqn. 9, $$R_{I,NEW} = \frac{R_{SP,CURRENT}}{R_{SP,NEW}} R_{I,CURRENT}, \qquad \text{(eqn. 9)}$$

wherein $R_{SP,CURRENT}$ is the speech coder and decoder bit rate determined prior to computing new operating parameters, $R_{SP,NEW}$ is newly determined speech coder and decoder bit rate, and $R_{I,CURRENT}$ is the interleaver and de-interleaver determined prior to computing new operating parameters.

In a preferred embodiment, operating parameters that differ from operating parameters determined previously are transmitted from a receiver to a transmitter.

Thus, what has been shown are a system and method to control bit rates and modulation strategy (e.g., communication rates) for a transmitter and a receiver based on changing channel conditions. What has also been shown are a system and method for allocating bits for error coding when a predetermined noise level is detected in a communication channel. Also shown are a system and method to adjust a modulation rate for a modulator when a bit-error-rate for a receiver compares to a threshold. Also shown are a system and method to provide graceful degradation for a low rate speech coder when a predetermined noise threshold is determined for a channel. What has also been shown are a system and method wherein a transmitter conveys a signal at a predetermined power level.

What is claimed is:

1. A method for controlling a communication rate for an adaptive rate communication system, the adaptive rate communication system conveying a signal from a transmitter to a receiver through a channel, the method comprising the steps of:

computing an effective bit rate for the channel based on an available bit rate and an average effective information content at the receiver;

determining operating parameters for the transmitter and the receiver based on the effective bit rate and a percentage of speech in a received signal; and transmitting the operating parameters from the receiver to the transmitter for use in subsequent communications of the received signal from the transmitter to the receiver.

2. A method as claimed in claim 1, the method further comprising the steps of:

estimating, in the receiver, a signal-to-noise ratio for the signal received through the channel;

computing a capacity adjustment factor; and determining the average effective information content at the receiver based on the capacity adjustment factor.

3. A method as claimed in claim 1, the method further comprising the steps of:

checking a bit-error-rate for a channel coder with a predetermined bit-error-rate;

equating a bit-error-rate for the receiver with the bit-error-rate for the channel coder when the bit-error-rate for the channel coder compares to the predetermined bit-error-rate; and computing the average effective information content at the receiver based on the bit-error-rate for the channel coder.

4. A method as claimed in claim 1, the method further comprising the steps of:

estimating, at a demodulator, a first bit-error-rate for the signal generated at the demodulator;

computing a second bit-error-rate based on the first bit-error-rate and a predetermined channel code correction factor; and computing the average effective information content at the receiver based on the second bit-error-rate.

5. A method as claimed in claim 1, the method further comprising the steps of:

comparing source distortion for the signal with predetermined source distortion for a predetermined signal;

computing a capacity adjustment factor for source distortion based on the source distortion for the signal and the predetermined source distortion; and determining the average effective information content at the receiver based on the capacity adjustment factor.

6. A method as claimed in claim 1, wherein the determining step further includes the step of computing a new channel coder rate based on the percentage of speech in the signal, the new channel coder rate being one of the operating parameters conveyed from the receiver to the transmitter in the transmitting step.

7. A method as claimed in claim 1, wherein the determining step further includes the step of quantizing the effective bit rate to determine a new modem rate, the new modem rate being one of the operating parameters conveyed from the receiver to the transmitter in the transmitting step.

8. A method as claimed in claim 7, wherein the determining step further includes the step of computing a new speech coder rate based on the new modem rate, the percentage of speech in the signal, and a percentage of speech in a return path signal, the new speech coder rate being one of the operating parameters conveyed from the receiver to the transmitter in the transmitting step.

9. A method as claimed in claim 8, wherein the determining step further includes the step of computing a new interleaver rate based on a current speech coder rate, the new speech coder rate, and a current interleaver rate, the new interleaver rate being one of the operating parameters conveyed from the receiver to the transmitter in the transmitting step.

10. The method as claimed in claim 1 further comprising the steps of:

determining an amount of noise in the channel;

allocating a greater number of bits to speech coding when the amount of the noise is lower than a first predetermined threshold;

allocating a lower number of bits to speech coding when the amount of the noise is greater than a second predetermined threshold;

allocating a lower number of bits for error coding when the first mentioned allocating step is performed; and allocating a greater number of bits for error coding when the second mentioned allocating step is performed, and wherein the transmitting step additionally comprises providing feedback to the transmitter based on the amount of the noise, the transmitter performing the allocating steps based on the feedback.

11. An adaptive rate communication system comprising:

a receiver to receive a signal through a channel, the receiver to determine operating parameters for decoding the signal based on an effective bit rate and a percentage of speech in the signal; and a transmitter to transmit the signal through the channel, the transmitter responsive to the operating parameters when conveyed from the receiver, wherein the transmitter comprises:

a speech coder to determine speech parameters based on a speech signal and the operating parameters;

a channel coder to create a protected signal using the speech parameters and the operating parameters;

a modulator to transmit the protected signal at a modulation rate determined by the operating parameters; and an adaptive rate manager to convey the operating parameters to the speech coder, the channel coder, and the modulator.

12. An adaptive rate communication system comprising:

a receiver to receive a signal through a channel, the receiver to determine operating parameters for decoding the signal based on an effective bit rate and a percentage of speech in the signal; and a transmitter to transmit the signal through the channel, the transmitter responsive to the operating parameters when conveyed from the receiver, wherein:

the receiver further comprises means for determining an amount of noise in the channel, and wherein the transmitter further comprises means for allocating a greater number of bits to speech coding when the amount of the noise is lower than a first predetermined threshold, allocating a lower number of bits to speech coding when the amount of the noise is greater than a second predetermined threshold, allocating a lower number of bits for error coding when the first mentioned allocating step is performed, and allocating a greater number of bits for error coding when the second mentioned allocating step is performed, and wherein the receiver further comprises means for providing feedback information to the transmitter based on the amount of the noise and the transmitter performs the allocating based on the feedback.

13. An adaptive rate communication system comprising:

a receiver to receive a signal through a channel, the receiver to determine operating parameters for decoding the signal based on an effective bit rate and a percentage of speech in the signal; and a transmitter to transmit the signal through the channel, the transmitter responsive to the operating parameters when conveyed from the receiver, wherein the receiver comprises an adaptive rate manager to determine the operating parameters, the adaptive rate manager comprising:

a processor to compute the effective bit rate for the channel based on an available bit rate and an average effective information content at the receiver, and to determine the operating parameters for the adaptive rate communication system based on the effective bit rate and the percentage of speech in the signal; and the receiver further comprises means for providing the operating parameters to the transmitter for use in subsequent communications of the signal from the transmitter to the receiver.

14. An adaptive rate communication system as claimed in claim 13, wherein the receiver further comprises:

a demodulator to receive the signal through the channel;

a channel decoder to receive the signal through the demodulator and to correct bit errors in the signal to produce an error corrected signal; and a speech decoder to synthesize speech using the error corrected signal.

15. An adaptive rate communication system as claimed in claim 14, wherein the demodulator includes:

means for estimating a signal-to-noise ratio for the signal, and wherein the adaptive rate manager further includes:

means for computing a capacity adjustment factor based on the signal-to-noise ratio and a predetermined signal-to-noise ratio; and means for determining the average effective information content at the receiver based on the capacity adjustment factor.

16. An adaptive rate communication system as claimed in claim 14, wherein the channel decoder includes:

means for checking a bit-error-rate with a predetermined bit-error-rate, and wherein the adaptive rate manager further includes:

means for equating the bit-error-rate for the receiver with the bit-error-rate determined at the channel decoder when the bit-error-rate compares to the predetermined bit-error-rate; and means for computing the average effective information content at the receiver based on the bit-error-rate.

17. An adaptive rate communication system as claimed in claim 14, wherein the demodulator includes:

means for estimating a first bit-error-rate for the signal, and wherein the adaptive rate manager further includes:

means for computing a second bit-error-rate based on the first bit-error-rate and a predetermined channel code correction factor; and means for computing the average effective information content at the receiver based on the second bit-error-rate.

18. An adaptive rate communication system as claimed in claim 14, wherein the adaptive rate manager further includes:

means for comparing source distortion for the signal with predetermined source distortion for a predetermined signal;

means for computing a capacity adjustment factor based on the source distortion for the signal and the predetermined source distortion; and means for determining the average effective information content at the receiver based on the capacity adjustment factor.

* * * * *